United States Patent Office 3,429,246
Patented Feb. 25, 1969

3,429,246
MIRROR REFLEX CAMERA
Helmut Ebertz, Stuttgart-Mohringen, Germany, assignor to Zeiss-Ikon Aktiengesellschaft, Stuttgart, Germany, a corporation of Germany
Filed June 29, 1966, Ser. No. 561,581
Claims priority, application Germany, July 24, 1965, Z 11,671
U.S. Cl. 95—42  2 Claims
Int. Cl. G03b *19/12;* G01j *1/00, 1/52*

ABSTRACT OF THE DISCLOSURE

A mirror reflex camera which is equipped with a photoelectric light meter whose photoelectric element is arranged inside the camera on the bottom wall thereof and is energized by a portion of the light beam entering the camera objective. This portion of the light beam is deflected onto the photoelectric element by a single curved mirror having a spherical or aspherical convex reflecting surface. This mirror is fixedly attached to the rear of the customary pivotally mounted transparent mirror which reflects another portion of the light beam entering the camera objective into the viewfinder of the camera.

---

Figure 1:
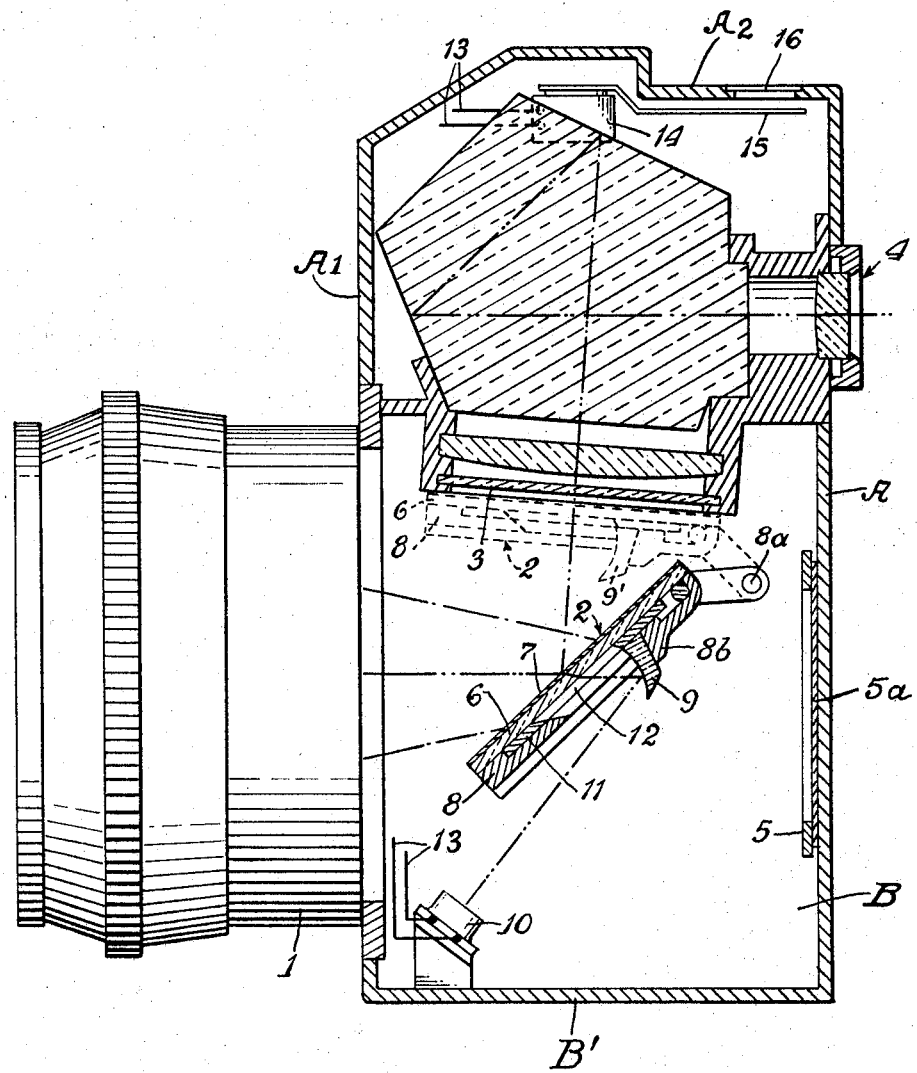

The invention relates to a mirror reflex camera provided in the camera chamber, preferably on the bottom wall thereof, with a photoelectric element which is energized by light passing through the camera objective, which light is first directed onto ray deflecting means arranged in rear of a conventional pivotally mounted reflex mirror which deflects most of the light rays into the viewfinder. The reflex mirror preferably is partially transparent for transmitting a portion of the light rays passing through the camera objective onto said ray deflecting means which in turn deflects the light rays onto said photoelectric element. The photoelectric element constitutes a part of an exposure meter associated with the camera.

If said ray deflecting means has a plane deflecting surface, the picture projected by the camera objective will be projected onto the photoelectric element when the latter is arranged in a plane which is conjugate to the picture plane in the camera.

Such a light measurement is, however, not always desired. If, for instance, the exit pupil of the camera objective is projected upon the photoelectric element, the brightness intensity in the objective pupil is measured, and thereby one makes himself independent of the individual details of different brightness in the picture plane.

In order to employ such a measuring method in a photographic camera of the mentioned type, the present invention employs a single deflecting mirror which is curved, namely either spherical or aspherical concave, when this deflecting mirror is to be used to image the exit pupil upon the photoelectric element. One will, however, select a spherical or aspherical convex shape of the deflecting mirror when the picture of the object photographed is to be projected by the objective at a distance upon the photoelectric element which differs from the distance of the image in the picture plane. This change in the projection distance may become necessary when the photoelectric element would be disposed directly within the light beam passing through the camera objective. Furthermore, it is desired to secure the photoelectric element on a wall portion within the camera chamber, preferably on the bottom wall. A change of the projection distance connected with such an arrangement of the photoelectric element may also be compensated for by giving the deflecting mirror a suitably curved surface. Preferably, the deflecting mirror is attached to the conventional pivotally mounted reflex mirror which in its operative or finder position is disposed in the camera chamber directly in the path of the beam of light passing through the camera objective.

The invention will now be described in greater detail with reference to the accompanying drawings, which illustrate a single lens mirror reflex camera equipped with the curved deflecting mirror system of the invention.

Figure 2:
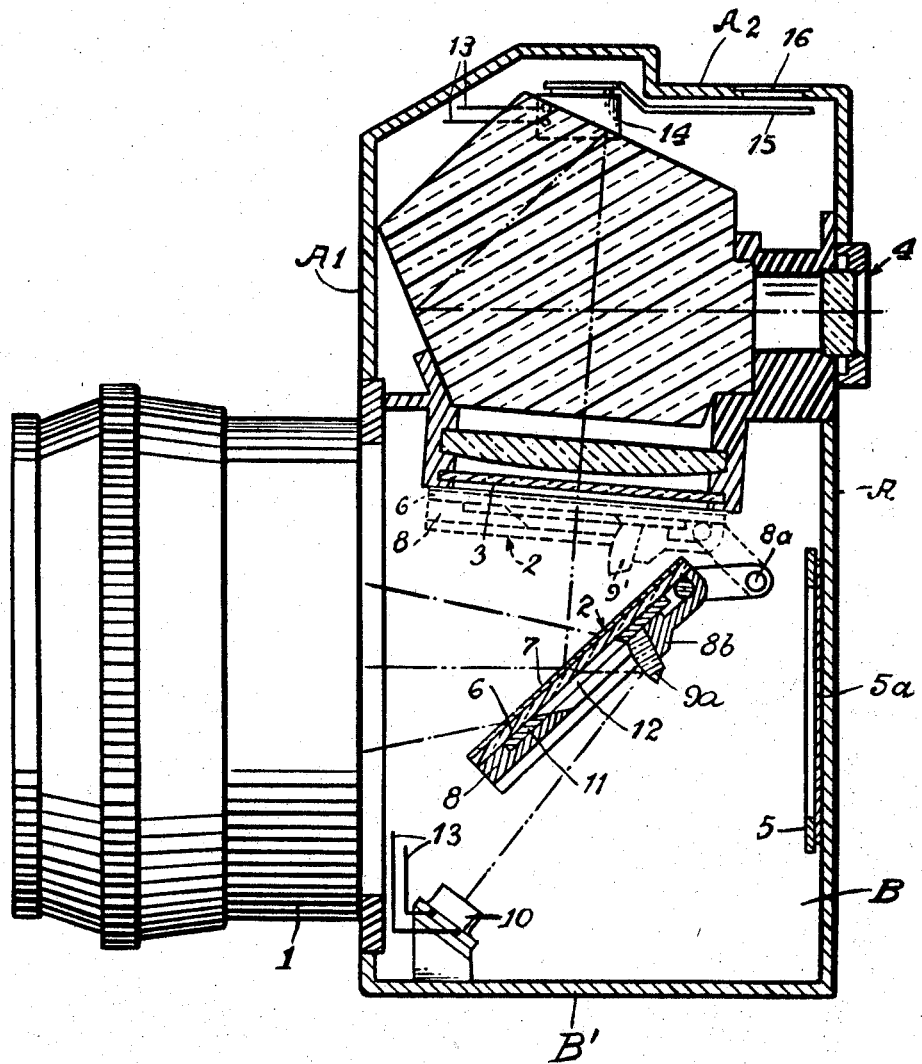

In the drawing:

FIG. 1 illustrates in a side elevation view with parts in vertical section a single lens mirror reflex camera with a curved deflecting mirror having a concave reflecting surface, and FIG. 2 illustrates the same camera with a curved deflecting mirror having a convex reflecting surface.

Referring to the drawing, the camera body A has attached to its front wall A1 a camera objective 1. The light rays which pass through this objective into the camera chamber B are deflected in part by a pivotally mounted mirror 2, when the latter is in its operative or "finder" position, toward the focusing plate 3 of the viewfinder, so that a real viewfinder image is produced in the plane of this plate which may be viewed by the finder device 4. When taking a picture, namely when exposing the film 5a, the pivoted mirror 2 is pivotally moved upwardly into the position indicated by dash lines, so that all of the light rays passing through the objective 1 may reach the diagrammatically indicated picture window 5 in rear of which is disposed the film 5a.

The pivoted mirror 2 comprises a glass plate 6, the surface of which facing the objective 1 is covered with a partly transparent mirror layer 7. This layer 7 may extend over the entire surface of the glass plate 6 or may cover only parts of the same, while the rest of the glass plate 6 is covered by a totally reflective layer. In the latter case, the viewfinder image would have areas of different brightness, and for this reason it is preferable to have the entire surface of the glass plate 6 covered by a partly transparent layer 7.

The glass plate 6 is mounted on a carrier 8 which in turn is pivotally supported as diagrammatically indicated at 8a. The carrier 8 is also used to carry the single concave deflecting mirror 9 of the invention which in the illustrated embodiment of the invention is fixedly attached to a projection 8b on the rear of the carrier 8 and in rear of the partly transparent layer 7. It is, however, also possible to mount the deflecting mirror 9 pivotally adjustable on the carrier 8 or, as shown in FIG. 2, to employ a mirror 9a having an aspherical or a spherical convex reflecting surface. In the present embodiment, a fixed attachment of the concave deflecting mirror 9 to the carrier 8 has been selected, because the deflecting mirror 9 in its inoperative position 9' (shown in dash lines) does not extend or cut into the beam of light which illuminates the picture window 5 when the mirror is in its inoperative position.

The concave deflecting mirror 9 deflects a portion of the light rays passing through the camera objective 1 and through the partly transparent layer 7 toward the photoelectric element 10 which is fixedly mounted in the camera chamber B on the bottom wall B1 thereof and projects the exit pupil of the camera objective 1 upon the photoelectric element 10. The position of the photoelectric element 10 is determined by the condition that it should be placed at least approximately in a plane which is conjugate to the plane of the film 5a in the camera. The photoelectric element 10 is electrically connected by electric conductors 13 with a measuring instrument 14, whose movable indicator hand 15 is visible through a window 16 arranged in the top wall A2 of the camera body A.

On the rear face of the glass plate 6 is arranged a diaphragm plate 11 provided with an aperture 12 which in cross section is conical. This diaphragm plate 11 restricts the beam of light passing through the objective 1 to a cross section which corresponds to the maximum aperture of this camera objective.

What I claim is:

1. In a mirror reflex camera having a camera objective arranged on the front wall of a camera casing, a viewfinder, a pivotally mounted partly transparent mirror for reflecting a portion of the light beam passing through said camera objective into said viewfinder, a photoelectric element mounted fixedly inside said camera casing on the bottom wall thereof, and light beam deflecting means for directing a portion of the light beam entering said camera through said camera objective onto said photoelectric element, said light beam deflecting means comprising a single curved mirror which is fixedly mounted on the rear of said partly transparent mirror so as to be pivotally moved with the latter, said mirror having a spherical convex reflecting surface.

2. A mirror reflex camera according to claim 1, in which said single curved mirror is provided with an aspherical convex reflecting surface.

References Cited

UNITED STATES PATENTS 3,332,331   7/1967   Mandler _____ 95—42

C. B. FUNK, *Assistant Examiner.*

NORTON ANSHER, *Primary Examiner.*

U.S. Cl. X.R.

95—10